US006828968B1

(12) United States Patent
Tenorio

(10) Patent No.: US 6,828,968 B1
(45) Date of Patent: Dec. 7, 2004

(54) COMPUTER GENERATION AND DISPLAY OF A TABLE OF DATA INCORPORATING ONE OR MORE COLOR PATTERNS

(75) Inventor: Manoel Tenorio, Mountain View, CA (US)

(73) Assignee: i2 Technologies US, Inc., Dallas, TX (US)

( * ) Notice: Subject to any disclaimer, the term of this patent is extended or adjusted under 35 U.S.C. 154(b) by 116 days.

(21) Appl. No.: 09/970,118

(22) Filed: Oct. 3, 2001

(51) Int. Cl.[7] ............................................. G06T 11/20
(52) U.S. Cl. ..................................... 345/440; 707/100
(58) Field of Search .............................. 345/440, 440.2, 345/169 FOR; 705/26, 52; 707/6, 100; 709/217, 219, FOR 120, 122

(56) References Cited

U.S. PATENT DOCUMENTS

2002/0198785 A1 * 12/2002 Chae ........................... 705/26

OTHER PUBLICATIONS

Thomas Chester & Richard Alden, Mastering Excel 97, 1997, Sybex, Fourth Edition, p. 143, 383–384 and 447–448.*
@The Moment: The Platform for Real–Time Trading; "How Quickly Can You Repsond to Your Markets?" pp. 1, Date Unknown.
@The Moment Solutions; "Dynamic Trading for a Dynamic World" pp 1, Date Unknown.
Trade@The Moment: The Platform for Real–Time Trading; pp 1–2, Date Unknown.
@The Moment Real–Time Trading Applications; pp 1–2, Date Unknown.
@The Moment Professional Services; pp 1, Date Unknown.
@The Moment Trade @The Moment FAQ; "Frequently Asked Questions (FAQ) About Dynamic Trading" pp 1–9, Date Unknown.
Trade@The Moment Demos; pp 1, Date Unknown.
@The Moment Screen Shots; pp 1–3, Date Unknown.
Market Operator Navigation; pp 1, Date Unknown.
Market Type Selection Page; pp 1–2, Date Unknown.
Market Access Control Selection Page; pp 1–2, Aug. 9, 2001.
Market Report; "marketplace@the moment;" pp 1, Aug. 9, 2001.
Bid/Ask Pricing Page, pp 1–4, Aug. 9, 2001.
Auction Page; pp 1–4, Date Unknown.
Bid/Ask Page/Pitometer; pp 1–4, Aug. 9, 2001.
Bid/Ask Page/Order Book; pp 1–4, Aug. 9, 2001.
@TheMoment Technology; pp 1–2, Date Unknown.

(List continued on next page.)

Primary Examiner—Matthew C. Bella
Assistant Examiner—G. F. Cunningham
(74) Attorney, Agent, or Firm—Baker Botts L.L.P.

(57) ABSTRACT

A computer-implemented system for generating and displaying a table of data incorporating one or more color patterns includes a computer system. The computer system accesses a plurality of data records that include one or more fields containing data. The computer system generates a table for the data. The table includes multiple rows corresponding to data records and multiple columns corresponding to fields. The rows intersect the columns to define a cell at where they intersect. Each cell contains data for the data record and field corresponding to the intersecting row and column, respectively. The computer system incorporates a first color pattern into the rows such that a color of each row substantially differs in hue from a color of adjacent rows. The first color pattern provides visual connectivity among the cells within each row. The computer system incorporates a second color pattern into the columns such that a color of each column substantially differs from a color of its adjacent columns with respect to at least one of key value, saturation, and luminescence. The second color pattern provides visual connectivity among the cells within each column. The computer system provides the table for display to one or more users.

21 Claims, 1 Drawing Sheet

OTHER PUBLICATIONS

@TheMoment Papers; pp 1, Date Unknown.

@TheMoment Reliant Energy Customer Story, "Reliant Energy Turns to @TheMoment to Provide First ERCOT Auction for Electricity Generation Capacity;" pp 1–2, Date Unknown.

@TheMoment White Papers; pp 1, Date Unknown.

@TheMoment White Paper Series; "Leveraging Web–Based Dynamic Trading for Gas Pipeline Capacity Sales;" pp 1–8, Date Unknown.

@TheMoment White Paper Series; "Building Competitive Advantage in Turbulent Markets Through Web–Based Dynamic Trading Technologies;" pp 1–12, Date Unknown.

@TheMoment White Paper Series; "Reducing Inventory Risks in High–Tech Component Manufacturing with Forward Contracts;" pp 1–12, Date Unknown.

@TheMoment White Paper Series; "The Role off Web–Based Dynamic Trading in Restructured Electric and Gas Markets;" pp 1–14, Date Unknown.

Trade@TheMoment: LDC Data Sheet; "The Complete Trading Solution for LDCs;" pp 1–4, Date Unknown.

Trade@TheMoment:Power Data Sheet; "The Complete Trading Solution for Electric Utilities;" pp 1–2, Date Unknown.

Thomas Chester & Richard Alden, Mastering Excel 97, 1997, Sybex, Fourth Edition, pp. 139–141 and 329–330.*

* cited by examiner

| | 14a | 14b | 14c | 14d | 14e | 14f | 14g | 14h | 14n |
|---|---|---|---|---|---|---|---|---|---|
| 12a | 53246 | A | 12 | 126 | 65 | 10.350 | 5 | −20.500 | ... |
| 12b | 68519 | A | 15 | 130 | 65 | 11.000 | 2 | −20.900 | ... |
| 12c | 23478 | F | 13 | 120 | 65 | 12.562 | 3 | −20.000 | ... |
| 12d | 64358 | C | 14 | 112 | 65 | 9.381 | 3 | −19.950 | ... |
| 12e | 12358 | D | 15 | 110 | 65 | 11.000 | 3 | −21.200 | ... |
| 12f | 15976 | A | 19 | 156 | 65 | 12.100 | 3 | −22.000 | ... |
| 12g | 16587 | B | 20 | 198 | 65 | 13.652 | 4 | −20.001 | ... |
| 12h | 95387 | B | 14 | 211 | 65 | 13.333 | 5 | −20.012 | ... |
| 12i | 64582 | F | 15 | 160 | 65 | 15.243 | 5 | −19.999 | ... |
| 12j | 34982 | F | 16 | 167 | 65 | 10.258 | 6 | −18.985 | ... |
| 12k | 65873 | E | 17 | 172 | 65 | 13.000 | 4 | −19.563 | ... |
| 12l | 45913 | A | 18 | 189 | 65 | 14.565 | 3 | −18.965 | ... |
| 12n | ... | ... | ... | ... | ... | ... | ... | ... | ... |

COMPUTER GENERATION AND DISPLAY OF A TABLE OF DATA INCORPORATING ONE OR MORE COLOR PATTERNS

TECHNICAL FIELD OF THE INVENTION

This invention relates generally to computer-generated displays and more particularly to computer generation and display of a table of data incorporating one or more color patterns.

BACKGROUND OF THE INVENTION

Data may be displayed within a table having one or more rows and one or more columns. For example, data for a number of items may be displayed as a table having a number of rows that each correspond to a particular item and a number of columns that each correspond to a particular attribute for the items. Where a column intersects a row, which intersection may be referred to as a cell, there may be one or more attribute values for the corresponding item. When viewing a displayed table of data, a user may scan one or more rows, columns, or both to locate a particular cell within the table and ascertain the attribute values within that cell. Similarly, a user may scan a row to ascertain the item corresponding to a particular cell. A user may also scan a column to ascertain the attribute corresponding to a particular cell. Scanning a row may involve visually tracing all or a portion of the row from left to right (or right to left), and scanning a column may involve visually tracing all or a portion of the column from top to bottom (or bottom to top). Where the displayed table has a relatively large number of rows, columns, or both, it may be difficult for the user to scan such rows or columns, which may make it difficult for the user to effectively use the displayed table. For example, it may be difficult for a user to visually trace a relatively long row across the table without confusing the row with one or more adjacent rows. Similarly, it may be difficult for a user to visually trace a relatively long column down (or up) the table without confusing the column with one or more adjacent columns.

SUMMARY OF THE INVENTION

According to the present invention, disadvantages and problems associated with previous techniques for displaying tabular data may be substantially reduced or eliminated.

In one embodiment of the present invention, a computer-implemented method for generating and displaying a table of data incorporating one or more color patterns includes accessing a plurality of data records. Each data record comprising one or more fields, and each field contains data. The method includes generating a table for the data. The table includes multiple rows each corresponding to a data record and multiple columns each corresponding to a field. The rows intersect the columns to define a cell at the intersection of each row and each column. Each cell contains data for the data record and field corresponding to the intersecting row and column, respectively. The method includes incorporating a first color pattern into the rows such that a color of each row substantially differs in hue from a color of its adjacent rows. The first color pattern incorporated into the rows provides visual connectivity among the cells within each row. The method includes incorporating a second color pattern into the columns such that a color of each column substantially differs from a color of its adjacent columns with respect to at least one of key value, saturation, and luminescence. The second color pattern incorporated into the columns provides visual connectivity among the cells within each column. The method includes providing the table for display to one or more users.

Particular embodiments of the present invention may provide one or more technical advantages. For example, particular embodiments may facilitate use of a displayed table of data by incorporating one or more color patterns into the rows of the table, which may provide greater visual connectivity among the cells within each row and, in turn, make it easier for a user to visually trace rows within the table. Particular embodiments may similarly facilitate use of a displayed table of data by incorporating one or more color patterns into the columns of the table, which may provide greater visual connectivity among the cells within each column and, in turn, make it easier for a user to visually trace columns within the table. Particular embodiments may facilitate use of a displayed table of data by incorporating one or more color patterns into the rows of the table and one or more color patterns into the columns of the table, which may provide greater visual connectivity among the cells within each row and the cells within each column and, in turn, make it easier for a user to visually trace rows and columns within the table, for example, to locate a particular cell at which a row and a column intersect. The advantages of the present invention may be particularly evident when the number of rows and/or columns within the table is relatively large, such as might be the case during the discovery phase of an electronic commerce scenario. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figures 1, 2:
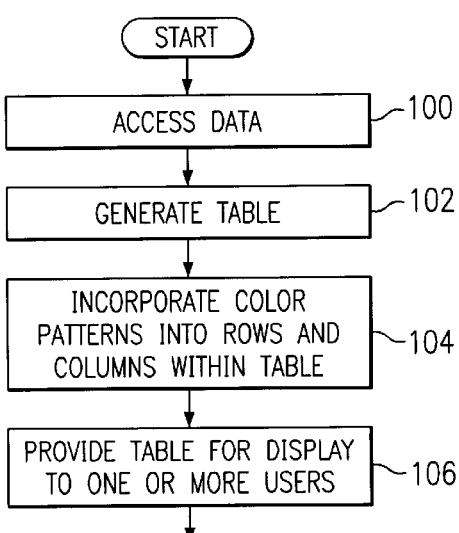
FIG. 1 illustrates an example table of data incorporating one or more color patterns.
FIG. 2 illustrates an example computer-implemented method for generating and displaying a table of data incorporating one or more color patterns.

FIG. 1 illustrates an example table 10 of data incorporating one or more color patterns. Table 10 may be displayed using any suitable computer-implemented technique. For example, a computer system having one or more computers may access data within a database system having one or more databases (which may be internally or externally associated with the computer system), generate table 10 (which may involve organizing the data and placing it within cells according to the designations given to the rows and columns of the table), and display table 10 using a monitor, projector, or other suitable output device. Although data is described and illustrated as being displayed within table 10, data displayed within table 10 may be stored using any suitable data storage arrangement. As an example only and not by way of limitation, data displayed within table 10 may include a number of data records (which may each include data that are related to a particular person, place, thing, or event). A data record may include a number of fields (which may each contain certain data), and each data record may include the same fields. Table 10 may include one or more horizontal rows 12 and one or more vertical columns 14. Each row 12 may correspond to a particular data record, and each column 14 may correspond to a particular field within all or some of the data records. Table 10 may also include a number of cells 16, each being located at the intersection of a row 12 and a column 14. Each cell 16 within table 10 may correspond to a particular field within a particular data record. Cells 16 may each contain text, numbers, symbols, or any other suitable information.

Any suitable data may be displayed within table 10. As an example only and not by way of limitation, table 10 may include data for a number of different items (which may include raw materials, component parts, products, or any other tangible or intangible things) available from a number of different sellers, which data may reflect attribute values (meaning particular instances of attributes) for the items and possibly other suitable information. Associated with each item may be a particular data record which may include one or more fields. Each field within a particular data record may contain an attribute value for the associated item. Thus, each row 12 within table 10 may correspond to a data record for a particular item, cells 16 within a particular row 12 may contain attribute values for the particular items, each column 14 within table 10 may correspond to a particular attribute for the items, cells 16 within a particular column 14 may contain attribute values corresponding to a particular attribute, and each cell 16 within table 10 may contain attribute values corresponding to a particular attribute for a particular item. For example, row 12a within table 10 may correspond to a data record for item A, row 12b within table 10 may correspond to a data record for item B, and so on. Cells 16 within row 12a may contain attribute values for item A, cells 16 within row 12b may contain attribute values for item B, and so on. Column 14a may correspond to a first attribute, such as item number, column 14b may correspond to a second attribute, such as price, and so on. Cell 16 at the intersection of row 12a and column 14a may contain the item number for item A, cell 16 at the intersection of row 12b and 14a may contain the item number for item B, and so on. The present invention contemplates any suitable data organized in any suitable manner being displayed within table 10.

When viewing table 10, a user may scan one or more rows 12, columns 14, or both to locate a particular cell 16. Similarly, a user may scan a particular row 12 to ascertain the particular data record corresponding to a particular cell 16. A user may also scan a particular column 14 to ascertain the particular field corresponding to a particular cell 16. Scanning a row 12 may involve visually tracing all or a portion of the row 12 from left (or right) to right (or left), and scanning a column 14 may involve visually tracing all or a portion of the column 14 from top (or bottom) to bottom (or top). For example, a user viewing table 10 may locate row 12f corresponding to item F (which may be uniquely identified by the item number within cell 16 at the intersection of row 12f and column 14a) and scan row 12f to ascertain one or more attribute values for item F. As another example, a user may scan a particular column 14 for a suitable attribute value, locate a suitable attribute value within that column 14, and scan the corresponding row 12 to ascertain the item number for the item having the located attribute value. It may be relatively difficult for a user to scan rows 12 or columns 14 within table 10, particularly if the number of rows and/or columns 14 within table 10 is relatively large, such as might be the case during the discovery phase of an electronic commerce scenario. For example, a user scanning a particular row 12 may confuse that row 12 with one or more adjacent rows 12 as the user's eye moves from left to right (or right to left). As another example, a user scanning a particular column 14 for a suitable attribute value may confuse that column 14 with one or more adjacent columns 14 as the user's eye moves from top to bottom (or bottom to top). The possibility of confusing rows 12 with other rows 12 and confusing columns 14 with other columns 14 may make it relatively difficult for the user to make effective use of table 10.

According to the present invention, one or more color patterns may be incorporated into rows 12 to provide for greater visual connectivity among cells 16 within each row 12, which may reduce the possibility of a user confusing one row 12 with another when scanning a particular row 12. In addition or as an alternative, one or more color patterns may be incorporated into columns 14 to provide for greater visual connectivity among cells within each column 14, which may reduce the possibility of a user confusing one column 14 with another when scanning a particular column 14. Any suitable color pattern or combination of color patterns may be incorporated into rows 12, columns 14, both. For example, color patterns including one or more color schemes may be used. Possible color schemes that may be incorporated into rows 12, columns 14, or both may include monochromatic color schemes (which may include one or more colors of a single hue), analogous color schemes (which may include two or more hues adjacent each other on a color wheel), complimentary color schemes (which may include two or more hues opposite each other on a color wheel), or other suitable color schemes. Any suitable properties of one or more colors may be used to create a color pattern that may be incorporated into rows 12, columns 14, or both. Such properties may include, for example, hue, key value, saturation (or intensity), luminescence, and any other suitable properties. Additionally, color patterns that may be incorporated into rows 12, columns 14, or both may include chromatic colors (meaning colors having a saturation of greater than zero), achromatic colors (meaning colors having zero saturation), or both.

"Hue" may encompass the property of colors by which they may be perceived as ranging from red to violet. Examples of hues may include red, orange, yellow, green, blue, indigo, and violet. "Key value" may encompass the relative lightness or darkness of a chromatic color or the relative whiteness or blackness of an achromatic color. A chromatic color having a relatively high key value may have a relatively high degree of lightness, and a chromatic color having a relatively low key value may have a relatively high degree of darkness. A color of a particular hue having a relatively high key value may be referred to as a "tint" of that hue, and a color of a particular hue having a relatively low key value may be referred to as a "shade" of that hue. For example, a pink (which may be referred to as a tint of red) may be a color of the hue red having a high key value, and a dark red (which may be referred to as a shade of red) may be a color of the hue red having a low key value. An achromatic color having a relatively high key value may have a relatively high degree of whiteness, and an achromatic color having a relatively low key value may have a relatively high degree of blackness. For example, a light gray may have a relatively high key value, and a dark gray may have a relatively low key value. "Saturation" (which may also be referred to as "intensity") may encompass the vividness of a hue, which may also be thought of as the degree of difference from a gray of the same lightness or darkness. "Luminescence" may encompass the emission of light that does not derive energy from the temperature of the emitting body (in this case table 10 or the monitor or other output device on which it is being displayed), as in phosphorescence, fluorescence, and bioluminescence.

In one embodiment, a color pattern including two different hues may be incorporated into the background color of rows 12 such that the background color of every even (or odd) row 12 is of one hue and the background color of every odd (or even) row 12 is of another hue. In addition, a color pattern including two different key values may be incorporated into the background color of columns 14 such that the background color of every even (or odd) column 14 is of one key value and the background color of every odd (or even) column 14 is of another key value. For example, the background color of rows 12a, 12c, 12e, 12g, etc. may be of the hue blue, and the background color or rows 12b, 12d, 12f, 12h, etc. may be of the hue orange. In addition, the background color of columns 14a, 14c, 14e, and 14g, etc. may have a relatively low key value, and the background color of columns 14b, 14d, 14f, 14h, etc. may have a relatively high key value. The combination of these two color patterns may result in the following color pattern: the background color of cells 16 where each of rows 12a, 12c, 12e, 12g, etc. intersect with each of columns 14a, 14c, 14e, 14g, etc. may be a low key value blue; the background color of cells 16 where each of rows 12b, 12d, 12f, 12h, etc. intersect with each of columns 14a, 14c, 14e, 14g, etc. may be a low key value orange; the background color of cells 16 where each of rows 12a, 12c, 12e, 12g, etc. intersect with each of columns 14b, 14d, 14f, 14h, etc. may be a high key value blue; and the background color of cells 16 where each of rows 12b, 12d, 12f, 12h, etc. intersect with each of columns 14b, 14d, 14f, 14h, etc. may be a high key value orange. The resulting color pattern may increase the visual connectivity of cells 16 within each row 12 and the visual connectivity of cells 16 within each column 14, which may make it easier for a user to scan rows 12, columns 14, or both within table 10, particularly if the number of rows 12 and/or columns 14 within table 10 is relatively large, such as might be the case during the discovery phase of an electronic commerce scenario.

Although particular colors and properties of colors are described, the present invention contemplates any suitable colors and any and any suitable properties of colors being used. Although incorporating one or more color patterns into the background colors of rows 12, columns 14, or both is primarily described and illustrated, the present invention contemplates incorporating one or more color patterns into the information displayed within cells 16 in addition or as an alternative to incorporating one or more color patterns into the background color of rows 12, columns 14, or both. For example, the text, numbers, symbols, or other information displayed within cells 16 may be given different colors according to one or more color patterns, as described above, instead of incorporating such color schemes into the background colors of rows 12 and columns 14 within table 10.

FIG. 2 illustrates an example computer-implemented method for generating and displaying a table of data incorporating one or more color patterns. The method begins at step 100, where a computer system having one or more computers accesses data within a database system having one or more databases, which database system may be internally or externally associated with the computer system. As described above, any suitable data may be accessed to generate and display table 10. For example, data for a number of items available from a number of sellers may be accessed in connection with the discovery phase of an electronic commerce scenario. At step 102, the computer system generates table 10, which may include rows 12, columns 14, and cells 16, as described above. Generating table 10 may involve organizing the accessed data and placing it within cells 16 according to the designations given to the rows 12 and columns 14 within table 10. At step 104, the computer system incorporates color patterns into rows 12 and columns 14. Step 104 may occur substantially simultaneously with step 102. As described above, any suitable color pattern or combination of color patterns may be incorporated into rows 12 and columns 14, and any suitable properties of one or more colors may be used to create a color pattern that may be incorporated into rows 12 and columns 14. Such properties may include hue, key value, saturation, luminescence, and other suitable properties. Additionally, color patterns that may be incorporated into rows 12 and columns 14 may include chromatic colors, achromatic colors, or both.

In one embodiment, a color pattern including two different hues may be incorporated into the background color of rows 12 such that the background color of every even (or odd) row 12 is of one hue and the background color of every odd (or even) row 12 is of another hue. In addition, a color pattern including two different key values may be incorporated into the background color of columns 14 such that the background color of every even (or odd) column 14 is of one key value and the background color of every odd (or even) column 14 is of another key value. Although incorporating one or more color patterns into the background colors of rows 12 and columns 14 is primarily described and illustrated, the present invention contemplates incorporating one or more color patterns into the information displayed within cells 16 in addition or as an alternative to incorporating one or more color patterns into the background color of rows 12, columns 14, or both. At step 106, the computer system provides table 10 for display to one or more users, and the method ends. The computer system may provide table 10 for display on an associated monitor or other output device, may provide table 10 for communication over the Internet or otherwise to a remote system for display, or may provide table 10 for display in any other suitable manner.

Although the present invention has been described with several embodiments, divers changes, substitutions, variations, and modifications may be suggested to one skilled in the art, and it is intended that the invention may encompass all such changes, substitutions, variations, alterations, and modifications fall within the spirit and scope of the appended claims.

What is claimed is:

1. A computer-implemented system for generating and displaying a table of data incorporating user specified color patterns, comprising a computer system operable to:

access a plurality of data records, each data record comprising one or more fields, each field containing data;

generate a table for the data, the table comprising a plurality of rows each corresponding to a data record and a plurality of columns each corresponding to a field, the rows intersecting the columns to define a cell at the intersection of each row and each column, each cell containing data for the data record and field corresponding to the intersecting row and column, respectively;

in response to user input specifying a first color pattern for incorporation into the all the rows of the table, automatically incorporate the user specified first color pattern into all the rows of the table such that a color of each row of the table substantially differs in hue from a color of its adjacent rows, the user specified first color pattern automatically incorporated into all the rows of the table providing visual connectivity among all the cells within each row of the table;

in response to user input specifying a second color pattern for incorporation into all the columns of the table, automatically incorporate the user specified second color pattern into all the columns of the table such that a color of each column of the table substantially differs from a color of its adjacent columns with respect to at least one of key value, saturation, and luminescence, the user specified second color pattern automatically incorporated into all the columns of the table providing visual connectivity among all the cells within each column of the table, the visual connectivity among all the cells within each column of the table provided via the user specified second specified color pattern not disrupting the visual connectivity among all the cells within each row of the table provided via the user specified first color pattern; and provide the table incorporating the user specified first and second color patterns for display to one or more users.

2. The system of claim 1, wherein the colors of two adjacent rows have hues that are complimentary to each other.

3. The system of claim 1, wherein the colors of the rows and columns are chromatic colors.

4. The system of claim 1, wherein the rows are horizontal and the columns are vertical.

5. The system of claim 1, wherein:
the accessed data records reflect information for one or more items available from one or more sellers; and
the computer system is operable to access the data records in connection with the discovery phase of an electronic commerce scenario.

6. The system of claim 1, wherein:
the user specified first color pattern comprises a background color of each row substantially differing in hue from a background color of its adjacent rows; and
the user specified second color pattern comprises a background color of each column substantially differing from a background color of its adjacent columns with respect to at least one of key value, saturation, and luminescence.

7. The system of claim 1, wherein:
the user specified first color pattern comprises a color of the data representation in each cell within each row substantially differing in hue from a color of the data representation in each cell within its adjacent rows; and
the user specified second color pattern comprises a color of the data representation in each cell within each column substantially differing from a color of the data representation in each cell within its adjacent columns with respect to at least one of key value, saturation, and luminescence.

8. A computer-implemented method for generating and displaying a table of data incorporating user specified color patterns, comprising:
accessing a plurality of data records, each data record comprising one or more fields, each field containing data;
generating a table for the data, the table comprising a plurality of rows each corresponding to a data record and a plurality of columns each corresponding to a field, the rows intersecting the columns to define a cell at the intersection of each row and each column, each cell containing data for the data record and field corresponding to the intersecting row and column, respectively;
in response to user input specifying a first color pattern for incorporation into all the rows of the table, automatically incorporating the user specified first color pattern into all the rows of the table such that a color of each row of the table substantially differs in hue from a color of its adjacent rows, the user specified first color pattern automatically incorporated into all the rows of the table providing visual connectivity among all the cells within each row of the table;

in response to user input specifying a second color pattern for incorporation into all the columns of the table, automatically incorporating the user specified second color pattern into all the columns of the table such that a color of each column of the table substantially differs from a color of its adjacent columns with respect to at least one of key value, saturation, and luminescence, the user specified second color pattern automatically incorporated into all the columns of the table providing visual connectivity among all the cells within each column of the table, the visual connectivity among all the cells within each column of the table provided via the user specified second specified color pattern not disrupting the visual connectivity among all the cells within each row of the table provided via the user specified first color pattern; and providing the table incorporating the user specified first and second color patterns for display to one or more users.

9. The method of claim 8, wherein the colors of two adjacent rows have hues that are complimentary to each other.

10. The method of claim 8, wherein the colors of the rows and columns are chromatic colors.

11. The method of claim 8, wherein the rows are horizontal and the columns are vertical.

12. The method of claim 8, wherein:
the accessed data records reflect information for one or more items available from one or more sellers; and
accessing the data records comprises accessing the data records in connection with the discovery phase of an electronic commerce scenario.

13. The method of claim 8, wherein:
the user specified first color pattern comprises a background color of each row substantially differing in hue from a background color of its adjacent rows; and
the user specified second color pattern comprises a background color of each column substantially differing from a background color of its adjacent columns with respect to at least one of key value, saturation, and luminescence.

14. The method of claim 8, wherein:
the user specified first color pattern comprises a color of the data representation in each cell within each row substantially differing in hue from a color of the data representation in each cell within its adjacent rows; and
the user specified second color pattern comprises a color of the data representation in each cell within each column substantially differing from a color of the data representation in each cell within its adjacent columns with respect to at least one of key value, saturation, and luminescence.

15. Software for generating and displaying a table of data incorporating user specified color patterns, the software embodied in computer-readable media and when executed operable to:
access a plurality of data records, each data record comprising one or more fields, each field containing data;
generate a table for the data, the table comprising a plurality of rows each corresponding to a data record and a plurality of columns each corresponding to a field, the rows intersecting the columns to define a cell at the intersection of each row and each column, each cell containing data for the data record and field corresponding to the intersecting row and column, respectively;

in response to user input specifying a first color pattern for incorporation into all the rows of the table, automatically incorporate the user specified first color pattern into all the rows of the table such that a color of each row of the table substantially differs in hue from a color of its adjacent rows, the user specified first color pattern automatically incorporated into all the rows of the table providing visual connectivity among all the cells within each row of the table;

in response to user input specifying a second color pattern for incorporation into all the columns of the table, automatically incorporate the user specified second color pattern into all the columns of the table such that a color of each column of the table substantially differs from a color of its adjacent columns with respect to at least one of key value, saturation, and luminescence, the user specified second color pattern automatically incorporated into all the columns of the table providing visual connectivity among all the cells within each column of the table, the visual connectivity among all the cells within each column of the table provided via the user specified second specified color pattern not disrupting the visual connectivity among all the cells within each row of the table provided via the user specified first color pattern; and provide the table incorporating the user specified first and second color patterns for display to one or more users.

16. The software of claim 15, wherein the colors of two adjacent rows have hues that are complimentary to each other.

17. The software of claim 15, wherein the colors of the rows and columns are chromatic colors.

18. The software of claim 15, wherein the rows are horizontal and the columns are vertical.

19. The software of claim 15, wherein:
the accessed data records reflect information for one or more items available from one or more sellers; and
the software is operable to access the data records in connection with the discovery phase of an electronic commerce scenario.

20. The software of claim 15, wherein:
the user specified first color pattern comprises a background color of each row substantially differing in hue from a background color of its adjacent rows; and
the user specified second color pattern comprises a background color of each column substantially differing from a background color of its adjacent columns with respect to at least one of key value, saturation, and luminescence.

21. The software of claim 15, wherein:
the user specified first color pattern comprises a color of the data representation in each cell within each row substantially differing in hue from a color of the data representation in each cell within its adjacent rows; and
the user specified second color pattern comprises a color of the data representation in each cell within each column substantially differing from a color of the data representation in each cell within its adjacent columns with respect to at least one of key value, saturation, and luminescence.

* * * * *